(12) United States Patent
Liu

(10) Patent No.: US 11,817,599 B2
(45) Date of Patent: Nov. 14, 2023

(54) EXPLOSION-PROOF VALVE CORE, EXPLOSION-PROOF VALVE, AND BOX BODY GAS TIGHTNESS DETECTION CLAMP

(71) Applicant: DONGGUAN PUWEI WATERPROOF AND BREATHABLE MEMBRANE MATERIAL CO., LTD, Dongguan (CN)

(72) Inventor: Xiangmin Liu, Yichun (CN)

(73) Assignee: DONGGUAN PUWEI WATERPROOF AND BREATHABLE MEMBRANE MATERIAL CO., LTD, Dongguan (CN)

( * ) Notice: Subject to any disclaimer, the term of this patent is extended or adjusted under 35 U.S.C. 154(b) by 472 days.

(21) Appl. No.: 17/209,143

(22) Filed: Mar. 22, 2021

(65) Prior Publication Data

US 2021/0210817 A1 Jul. 8, 2021

Related U.S. Application Data

(63) Continuation of application No. PCT/CN2019/096136, filed on Jul. 16, 2019.

(30) Foreign Application Priority Data

Sep. 26, 2018 (CN) .......................... 201811124940.6

(51) Int. Cl.
*H01M 50/333* (2021.01)
*G01M 3/02* (2006.01)
(Continued)

(52) U.S. Cl.
CPC ....... *H01M 50/333* (2021.01); *F16K 17/0413* (2013.01); *F16K 31/084* (2013.01);
(Continued)

(58) Field of Classification Search
CPC .............. H01M 50/333; H01M 50/394; F16K 17/0413; F16K 31/084; F16K 31/60; G01M 3/02
See application file for complete search history.

(56) References Cited

U.S. PATENT DOCUMENTS

2022/0140432 A1* 5/2022 Chen ................... H01M 50/209
429/53
2022/0344770 A1* 10/2022 Li ......................... F16K 17/196

FOREIGN PATENT DOCUMENTS

| CN | 106090365 A | 11/2016 |
| CN | 108533811 A | 9/2018 |

(Continued)

OTHER PUBLICATIONS

International Search Report issued in corresponding International application No. PCT/CN2019/096136, dated Sep. 30, 2019 (7 pages).

(Continued)

*Primary Examiner* — Kevin R Barss

(57) ABSTRACT

The present disclosure provides an explosion-proof valve core, an explosion-proof valve, and a box body gas tightness detection clamp, including an explosion-proof valve core, a valve body, and sealing rings. The waterproof gas-permeable explosion-proof valve core of the present disclosure timely discharges high-temperature and high-pressure in a box body, which prevents explosion or reduces damage caused by explosion. An inner sealing ring in the explosion-proof valve is fixed through an inner sealing ring groove, so that a problem of poor sealing caused by easy falling and displacement of the inner sealing ring is solved. A metal (Continued)

protective shell is disposed on an outer side of an explosion-proof valve spring, a problem that the spring is blocked by battery core jets to weaken pressure relief performance when working is solved. The present disclosure further provides the box body gas tightness detection clamp, which is simple to use and operate.

11 Claims, 6 Drawing Sheets

(51) Int. Cl.
  *F16K 31/08* (2006.01)
  *H01M 50/30* (2021.01)
  *F16K 17/04* (2006.01)
  *F16K 31/60* (2006.01)
(52) U.S. Cl.
  CPC .............. *F16K 31/60* (2013.01); *G01M 3/02* (2013.01); *H01M 50/394* (2021.01)

(56) References Cited

FOREIGN PATENT DOCUMENTS

| | | |
|---|---|---|
| CN | 208816714 U | 5/2019 |
| KR | 20090095767 A | 9/2009 |

OTHER PUBLICATIONS

Written Opinion of the International Searching Authority for No. PCT/CN2019/096136.

\* cited by examiner

EXPLOSION-PROOF VALVE CORE, EXPLOSION-PROOF VALVE, AND BOX BODY GAS TIGHTNESS DETECTION CLAMP

CROSS REFERENCE OF RELATED APPLICATIONS

The present application is a continuation-application of International (PCT) Patent Application No. PCT/CN2019/096136 filed on Jul. 16, 2019, which claims foreign priority of Chinese Patent Application No. 2018111249406, filed on Sep. 26, 2018, the entire contents of which are hereby incorporated by reference.

TECHNICAL FIELD

The present disclosure relates to a technical field of explosion-proof valves of sealed boxes and sealing performance detection, in particular to an explosion-proof valve core, an explosion-proof valve, and a box body gas tightness detection clamp.

BACKGROUND

Sealed boxes, such as outdoor electrical control boxes, energy storage battery boxes, electric vehicle battery packs, are a "heart" of related devices or new energy vehicles, and serve as a core component for controlling and driving, which safety, work stability, and work reliability directly affect use performance and security of the related devices or the new energy vehicles. When a controller box comes into water, insulation performance is reduced to cause a short circuit, and a control system is out of order. As a battery pack coming into water may lead to a short circuit of the battery, and further cause battery explosion, in order to prevent performance of components in the battery pack or components in an electrical control box being affected by water, dust, and so on, box bodies of outdoor electric appliance control boxes and the battery packs are required to be sealed, which waterproof and dustproof protection grade requirements should reach a national standard GB4208-2008 "shell protection level" (IP code) IP 67 or more. However, in a case of being completely sealed, the components in the electrical control box generate heat when working, so that gas is expanded in the box body due to rising of temperature. If the gas cannot be discharged in time, pressure in the box body is continuously increased, then the box body is deformed, a rubber seal component is out of effect, so that a waterproof and dust-proof level is reduced, the components in the electrical control box are damaged, and some other abnormal things are caused. In addition, for a sealed box equipped with elements such as a battery, a large capacitor and the like, when the battery and the large capacitor are out of control, high-temperature, high-pressure, and cell-injected particulate matter are generated, a high pressure may be generated in the box body, and there is a risk of violent explosion, so that an explosion-proof valve is required to prevent explosion or reduce damage caused by the explosion.

For detection of seal box protection levels, test methods and requirements for IP 67 and above protection levels are explicitly specified in GB4208-2008 standards, which is as following: a dustproof test adopts talcum powder to test a dustproof test box, and requires no dust deposition in the box body; and a waterproof test requires soaking for 1 meter of water depth, and test time is at least 30 minutes. Detection according to the above standard method is complex in operation and consumes much time, after detection, the box body is adhered with water and dust, so that the box body needs to be cleaned and dried, which is troublesome and only suitable for sampling inspection. Requirements for rapid detection in a mass production process of the sealed box bodies are not achieved. Thus, in the mass production process, methods of inflating or deflating is adopted to detect whether the box body is leaking and further verify whether the box is well sealed, thereby a protective effect of the box body is verified. The detection generally adopts following methods: (1) drilling a threaded hole on the box body, and detecting an inflation joint. This method has a high inflation detection speed, but needs to drill one more hole on the box body, which increases processing difficulty of the box body, moreover, after an inflation detection of the box body is qualified, one bolt is disposed for secondary plugging and sealing, so that a secondary sealing effect of the bolt cannot be verified, there are risks of poor secondary sealing effect and doing not meet the protective level. (2) inflating gas into the box body by a waterproof gas-permeable membrane of the explosion-proof valve. However, gas permeability of the waterproof gas-permeable membrane is generally small, an inflation or gas extraction speed is very slow, detection efficiency is low, and detection by inflating from the gas-permeable membrane exists risks of damaging waterproof gas-permeable membrane and causing the explosion-proof valve to be out of effect.

Therefore, the explosion-proof valves and box body seal detection of the prior art need to be further researched and improved.

SUMMARY

In order to solve one of above problems, the present disclosure provides an explosion-proof valve core. The explosion-proof valve core is provided with a waterproof gas-permeable membrane, a gas flow channel, and a metal sheet configured to rapidly open the explosion-proof valve core. In a normal working state, the waterproof gas-permeable membrane blocks water from entering, but is gas-permeable in both directions to achieve pressure balance inside and outside a box body, a protective shell is disposed on an outer side of a spring, and a problem that the spring is blocked by battery core jets when thermal runaway occurs in a battery pack is solved. The explosion-proof valve core is opened when testing gas tightness of the box body by inflating and pressure in the box body is too large, so that gas is rapidly filled or high-temperature and high-pressure gas is rapidly discharged, which greatly reduces possibility of breakage of the waterproof gas-permeable membrane and further prevents explosion or reduces damage caused by explosion.

In order to achieve above object, the present disclosure provides an explosion-proof valve core, including a valve core body, a waterproof gas-permeable membrane, a membrane fixing member, and a metal sheet. Valve core gas-permeable grooves, a first groove, and a second groove lower relative to the first groove are disposed on a valve core body end surface. One end of each of the valve core gas-permeable grooves is communicated with the first groove, another end of each of the valve core gas-permeable grooves extends to an outer side of the valve core body. The waterproof gas-permeable membrane is disposed inside the second groove, the membrane fixing member is disposed inside the second groove and is pressed at an edge of a surface of the waterproof gas-permeable membrane. The metal sheet is disposed inside the first groove.

Specifically, a third groove lower relative to the second groove is disposed on the valve core body end surface.

Specifically, metal sheet gas-permeable groove holes are disposed on the metal sheet, and the metal sheet gas-permeable groove holes are correspondingly communicated with the valve core gas-permeable grooves.

The present disclosure further provides an explosion-proof valve. An explosion-proof valve core capable of rapidly discharging high-temperature and high-pressure gas is disposed inside the explosion-proof valve, and a plurality of gas-permeable openings are disposed inside a valve body, which accelerates inflation or gas extraction speed, thereby rapidly adjusting temperature and gas press inside an installed box body. An inner sealing ring of the explosion-proof valve is fixed by an inner sealing ring groove, so that a problem of poor sealing due to the inner sealing ring falling or shifting is solved.

In order to achieve above object, the present disclosure provides an explosion-proof valve, including a valve body, an explosion-proof valve spring, an outer sealing ring, a guide rod, a protective shell, and an explosion-proof valve core. An installation groove configured to install the explosion-proof valve core is disposed on a surface of the valve body, and the explosion-proof valve is sealed inside the installation groove. A clamping groove is disposed on a side surface of the valve body. A valve core guiding hole is disposed on a center of the valve body. An inner wall of the valve body is integrated with the valve core guiding hole through a plurality of connecting ribs, and gas-permeable openings are formed between each two adjacent connecting ribs. A first gas-permeable hole penetrating through an extension direction of the guide rod is disposed inside the guide rod, a rod connection part is disposed on a bottom surface of a valve core body, and a valve core gas-permeable hole communicated with a third groove is disposed inside the rod connection part. The guide rod sequentially penetrates through the explosion-proof valve spring, the valve core guiding hole, and the guide rod connection part in the bottom surface of the valve core body, and is further in sliding fit with the valve core guiding hole. An outer sealing ring groove is disposed on a bottom surface of the valve body. An outer sealing ring is disposed inside the outer sealing ring groove.

Specifically, the explosion-proof valve further includes an inner sealing ring groove and an inner sealing ring. The inner sealing ring groove is disposed on a bottom of the installation groove, and the inner sealing ring is disposed inside the inner sealing ring groove.

Specifically, the inner sealing ring groove is a dovetail groove narrow at a top and wide at a bottom.

Specifically, installation holes are disposed on one end of the valve body distal from the explosion-proof valve core.

Specifically, installation threads are disposed on and extends from one end of the valve body distal from the explosion-proof valve.

The present disclosure further provides a box body gas tightness detection clamp. The box body gas tightness detection clamp is clamped in a clamping groove on a valve body through a clamping jaw to detect gas tightness of the valve body, which has fast detection speed, high efficiency, and rapid and convenient operation.

In order to achieve above object, the present disclosure provides a box body gas tightness detection clamp, including a clamp body, a magnet base, a clamp sealing ring, a guide pillar, and a clamp spring. The clamp body has an internal hollow structure, one end of the clamp body is closed and an opening is disposed on another end of the clamp body. A clamping jaw configured to clamp in a clamping groove is disposed on the opening. A first step is disposed on the closed one end of the clamp body, a fourth groove is disposed inside the first step. A guide pillar guiding hole communicated with the clamp body is disposed on a center of the fourth groove.

The magnet base is disposed inside the clamp body; a second gas-permeable hole penetrating through an extension direction of the magnet base, a magnet configured to adsorb a metal sheet in an explosion-proof valve core, and a clamp sealing ring in sealing connection with an edge of an end surface of a valve body are disposed on a bottom surface of the magnet base.

A guide pillar plug boss is disposed on a side wall of the guide pillar, a bottom surface of the guide pillar plug boss is clamped at an end surface of the fourth groove, and the guide pillar plug boss is inserted into the fourth groove through rotating the guide pillar. A third gas-permeable hole is disposed inside the guide pillar, a gas-permeable groove communicated with the third gas-permeable hole is disposed on a surface of one end of the guide pillar, the one end of the guide pillar sequentially penetrates through the guide pillar guiding hole and the clamp spring and connects with the magnet base, and the third gas-permeable hole of the guide pillar is communicated with a second gas-permeable hole.

Specifically, the box body gas tightness detection clamp further includes a handle. The handle is connected with the guide pillar through threads, or is integrated with the guide pillar.

Specifically, the magnet is a cylindrical or circular strong permanent magnet.

Beneficial effects of the present disclosure are as follows:

The valve core is internally provided with the waterproof gas-permeable membrane, the gas-permeable membrane fixing member, and the metal sheet. The gas-permeable membrane fixing member and the valve core body are in interference fit and tightly pressed on an outer side of the waterproof gas-permeable membrane, so that the waterproof gas-permeable membrane is tightly attached to the valve core body, which has stable and reliable fixing performance. The metal sheet in the valve core provides a simple and reliable method for opening the valve core when detecting a sealed box body.

The valve body is further provided with the inner sealing ring groove configured to install the inner sealing ring. The inner sealing ring groove effectively fixes the inner sealing ring, and prevents that when the valve core is opened, the inner sealing ring moves or moves out to cause the valve core reset thereby causing a poor sealing.

The protective shell is disposed on an outer side of the spring and is fixed below the valve body, when the thermal runaway occurs in the battery pack, the protective shell prevents the spring from being blocked by battery core jets and causing exhaust blockage, thus prevents the valve core from being hardly opened.

When the gas tightness of the sealed box body is detected, the valve core is sucked up by the magnet on the gas tightness detection clamp and the valve core is opened, compared with inflating from the gas-permeable membrane, inflating from a pressure relief channel has a high gas inlet speed, short periods of time, and high detection efficiency, and does no damage the gas-permeable membrane and prevents the explosion-proof valve from being out of effect. After blasting and releasing pressure, when the pressure in the box body is less than an opening pressure of the valve core, the valve core automatically resets to maintain a sealing state, so that explosion-proof performance of the explosion-proof valve is accurately detected in a manufacture procedure, and quality of the explosion-proof is further ensured. The box body gas tightness detection clamp is simple and fast to install and disassemble, and installation operation may be completed by 3 seconds.

Illustration of the accompanying drawing labels: 1. valve core body; 101. guide rod connection part; 102. valve core gas-permeable hole; 103. valve core gas-permeable groove; 104. third groove; 105. second groove; 106. first groove; 107. valve core body end surface; 2. waterproof gas-permeable membrane; 3. membrane fixing member; 4. metal sheet; 401 metal sheet gas-permeable groove hole; 5. protective cover; 6. guide rod; 601. first gas-permeable hole; 602. guide rod plug boss; 7. valve body; 701. valve core guiding hole; 702. gas-permeable opening; 703. clamping groove; 704. inner sealing ring groove; 705. connecting rib; 706. outer sealing ring groove; 707. installation hole; 708. installation thread; 709. valve body edge plug boss; 710. installation groove; 711. protective shell installation shaft; 8. inner sealing ring; 9. outer sealing ring; 10. explosion-proof valve spring; 11. protective shell; 12. clamp body; 121. clamping jaw; 122. first step; 123. fourth groove; 124. guide pillar guiding hole; 13. clamp spring; 14. magnet base; 141. second step; 142. guide pillar connecting part; 143. second gas-permeable hole; 144. fifth groove; 145. sixth groove; 146. seventh groove; 147. eighth groove; 15. magnet; 16. clamp sealing ring; 17. guide pillar; 171. guide pillar plug boss; 172. threaded hole; 173. plane; 174. third gas-permeable hole; 18. handle; and 19. gas tube joint.

DETAILED DESCRIPTION

Figure 1:
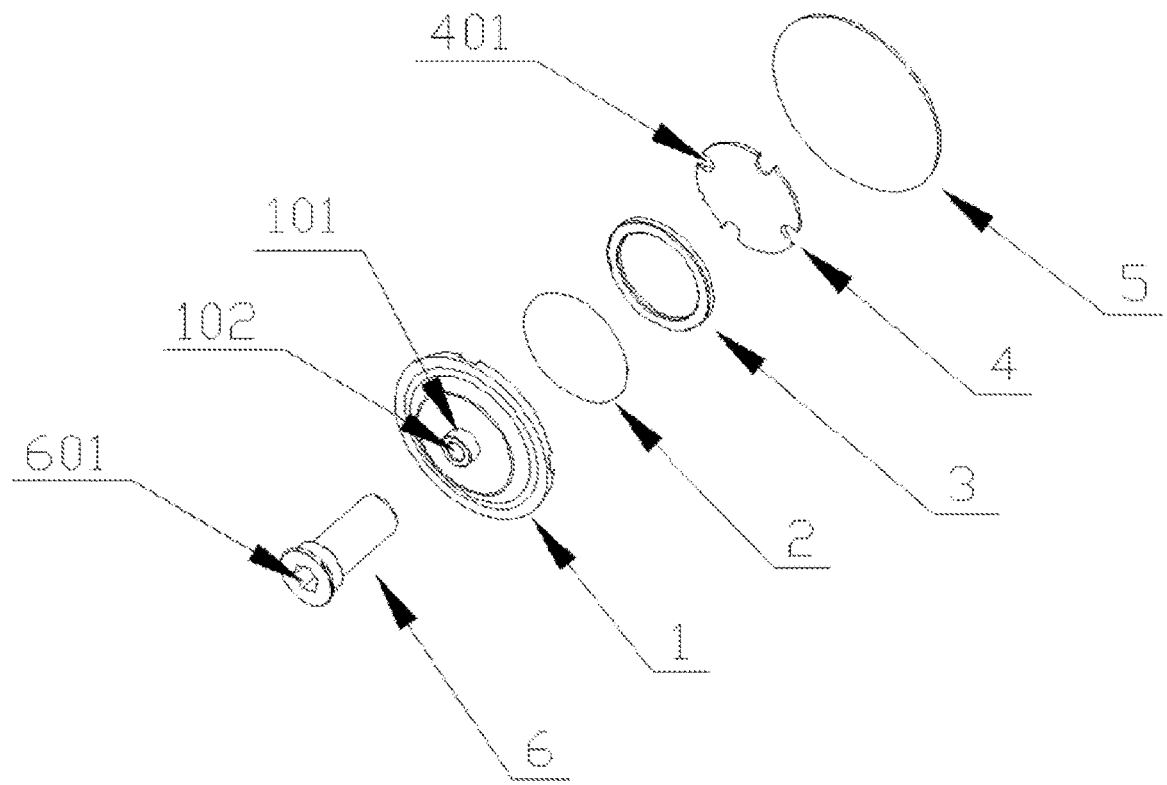
FIG. 1 is an explosion diagram of a valve core assembly according to one embodiment of the present disclosure.
Figure 2:
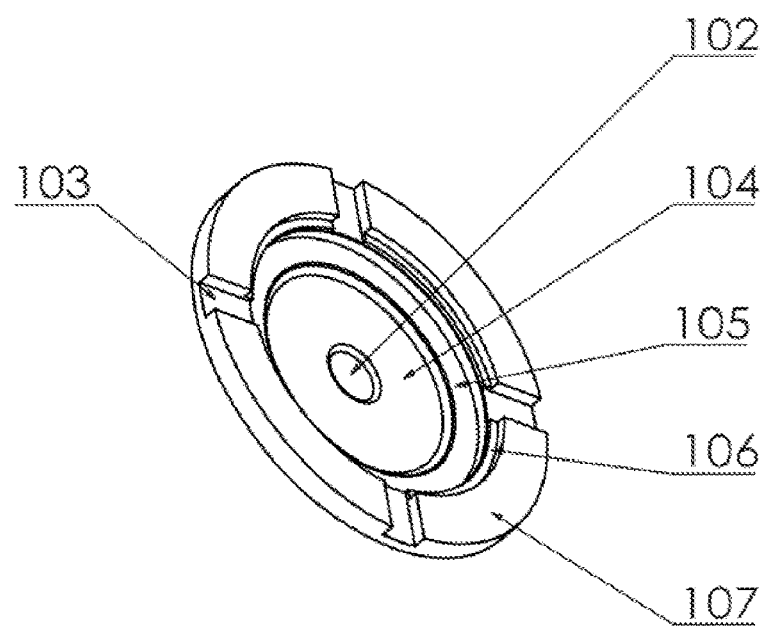
FIG. 2 is a perspective view diagram of a valve core body according to one embodiment of the present disclosure.
Figure 3:
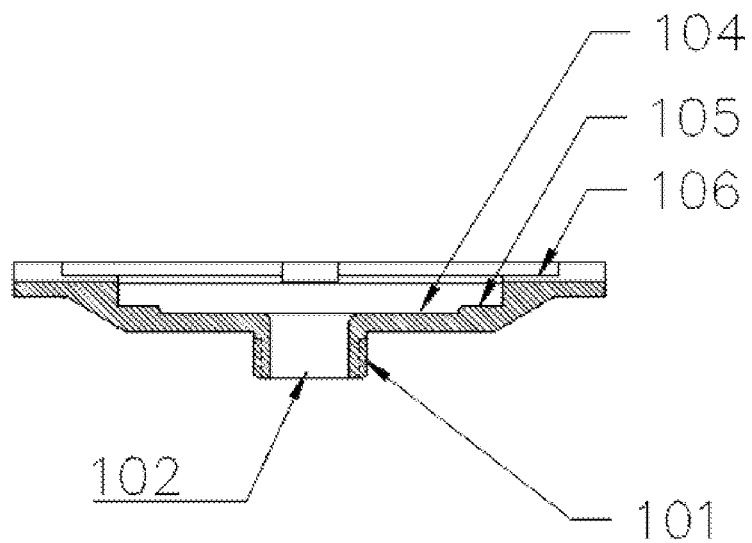
FIG. 3 is a cross-sectional schematic diagram of the valve core body according to one embodiment of the present disclosure.

As shown in FIGS. 1-3, the present disclosure provides an explosion-proof valve core, including a valve core body 1, a waterproof gas-permeable membrane 2, a membrane fixing member 3, a metal sheet 4, and a protective cover 5. Valve core gas-permeable grooves 103, a first groove 106, and a second groove 105 lower relative to the first groove 106 are disposed on a valve core body end surface 107. One end of each of the valve core gas-permeable grooves 103 is communicated with the first groove 106, another end of each of the valve core gas-permeable grooves 103 extends to an outer side of the valve core body 1. The waterproof gas-permeable membrane 2 is disposed inside the second groove 105, the membrane fixing member 3 is disposed inside the second groove 105 and is pressed at an edge of a surface of the waterproof gas-permeable membrane 2. The metal sheet 4 is disposed inside the first groove 106. The protective cover 5 is adhered to the valve core body end surface 107, or interference fit disposed on the valve core body 1.

As a preferred embodiment, the valve core is internally provided with the waterproof gas-permeable membrane 2, the gas-permeable membrane fixing member 3, and the metal sheet 4. The gas-permeable membrane fixing member 3 and the valve core body 1 are in interference fit and tightly pressed on an outer side of the waterproof gas-permeable membrane 2, so that the waterproof gas-permeable membrane 2 is tightly attached to the valve core body 4, which has stable and reliable fixing performance. The metal sheet 4 in the valve core is circular metal sheet that can be adsorbed by magnetic materials, a plurality of gas-permeable groove holes are disposed on the metal sheet 4, and when assembled, the plurality of the gas-permeable groove holes are matched with the valve core gas-permeable grooves 103. The metal sheet 4 in the valve core provides a simple and reliable method for opening the valve core when detecting a sealed box body.

Specifically, a third groove 104 lower relative to the second groove 105 is disposed on the valve core body end surface 107.

In the embodiment, the third groove 104 is configured to prevent the waterproof gas-permeable membrane 2 from being tightly attached to the valve core body 1 to block gas permeability, which increase effective gas-permeable area of the waterproof gas-permeable membrane 2.

Specifically, metal sheet gas-permeable groove holes 401 are disposed on the metal sheet 4, and the metal sheet gas-permeable groove holes 401 are correspondingly communicated with the valve core gas-permeable grooves 103.

In the embodiment, design of the metal sheet gas-permeable groove holes 401 is beneficial to rapidly disperse and discharge gas.

Figure 4:
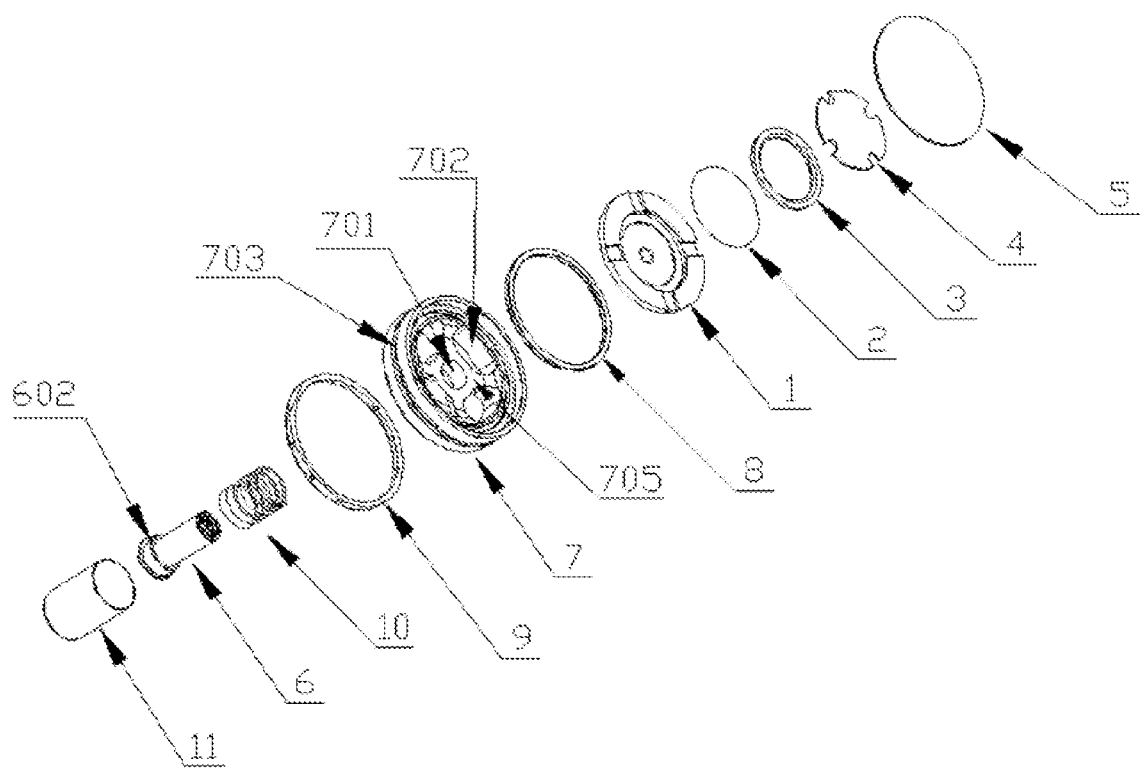
FIG. 4 is an explosion diagram of an explosion-proof valve according to one embodiment of the present disclosure.
Figure 5:
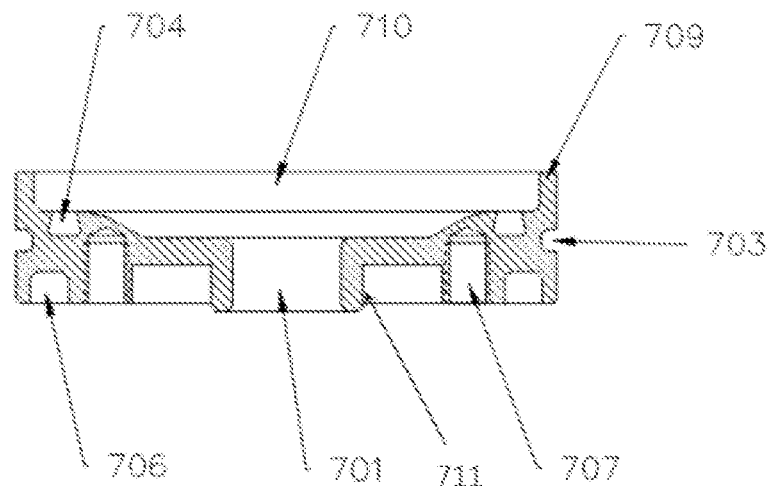
FIG. 5 is a cross-sectional schematic diagram of a valve body according to one embodiment of the present disclosure.
Figure 6:
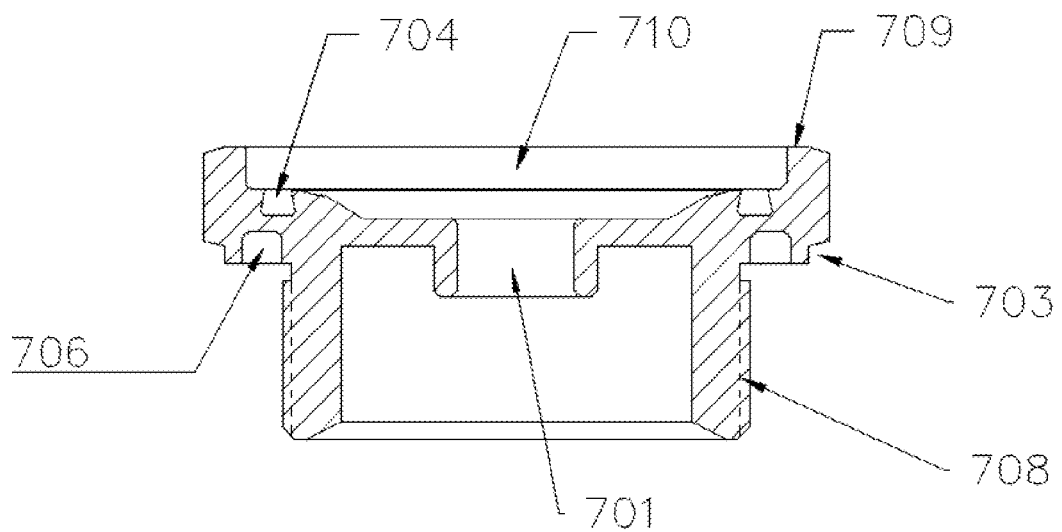
FIG. 6 is a cross-sectional schematic diagram of a valve body according to one embodiment of the present disclosure.
Figure 7:
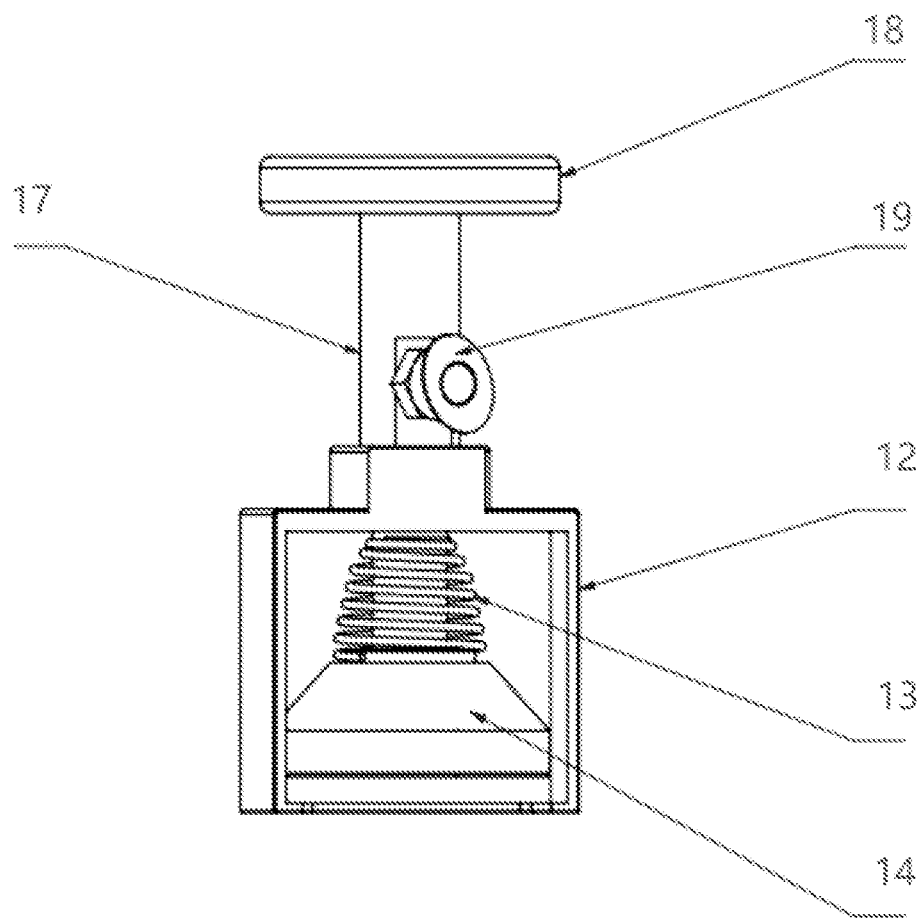
FIG. 7 is an assembled structure diagram of a box body gas tightness detection clamp according to one embodiment of the present disclosure.
Figure 8:
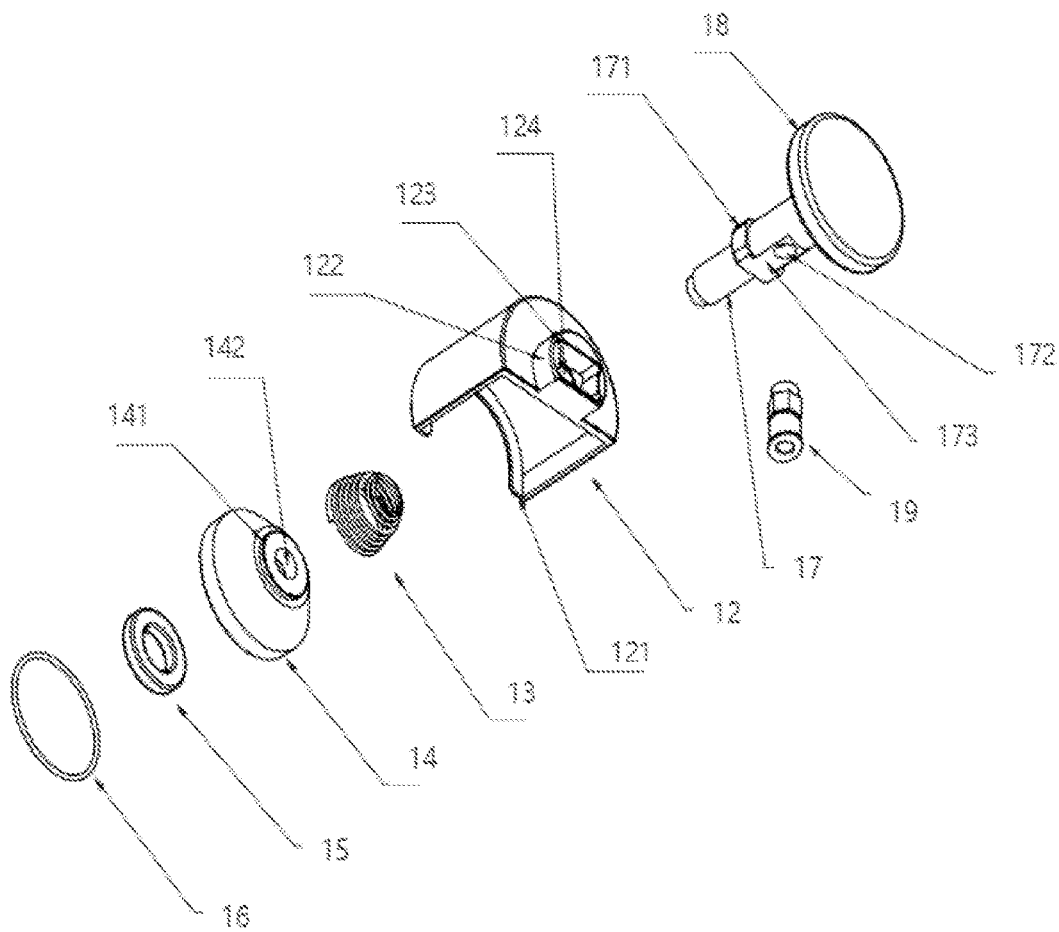
FIG. 8 is an assembled explosion diagram of the box body gas tightness detection clamp according to one embodiment of the present disclosure.
Figure 9:
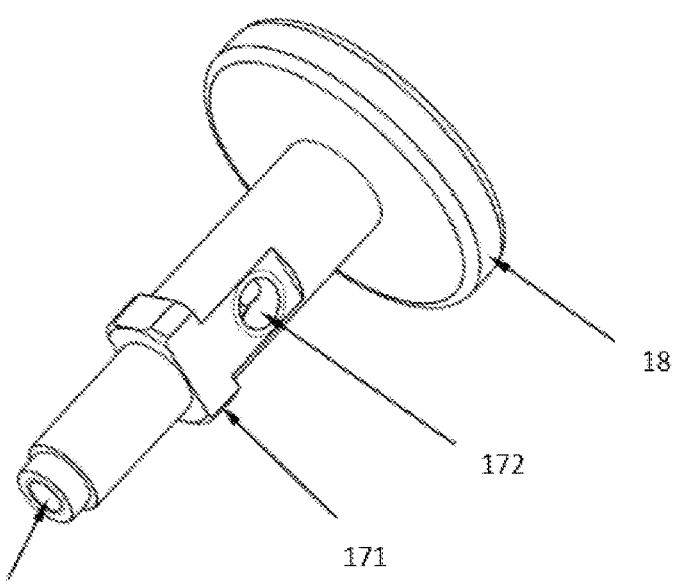
FIG. 9 is a perspective schematic diagram of a guide pillar according to one embodiment of the present disclosure.
Figure 10:
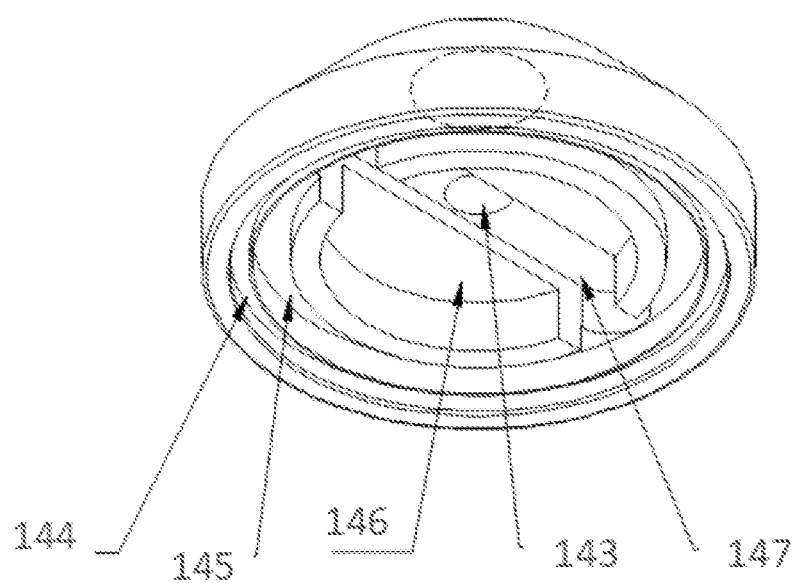
FIG. 10 is a perspective schematic diagram of a magnet base according to one embodiment of the present disclosure.

As shown in FIGS. 4-6, the present disclosure provides an explosion-proof valve, including a valve body 7, an explosion-proof valve spring 10, an outer sealing ring 8, a guide rod 6, and an explosion-proof valve core. An installation groove 710 configured to install the explosion-proof valve core is disposed on a surface of the valve body 7, and the explosion-proof valve is sealed inside the installation groove 710. A clamping groove 703 is disposed on a side surface of the valve body 7. A valve core guiding hole 701 is disposed on a center of the valve body 7. An inner wall of the valve body 7 is integrated with the valve core guiding hole 701 through a plurality of connecting ribs 705, and gas-permeable openings 702 are formed between each two adjacent connecting ribs 705. A first gas-permeable hole 601 penetrating through an extension direction of the guide rod is disposed inside the guide rod 6, a rod connection part 101 is disposed on a bottom surface of a valve core body 1, and a valve core gas-permeable hole 102 communicated with a third groove 104 is disposed inside the rod connection part 101. The guide rod 6 sequentially penetrates through the explosion-proof valve spring 10, the valve core guiding hole 102, and the guide rod connection part 101 in the bottom surface of the valve core body 1, and is further in sliding fit with the valve core guiding hole 102.

As a preferred embodiment, the valve body 7 is further provided with the inner sealing ring groove 704 configured to install the inner sealing ring 8. The inner sealing ring groove 704 effectively fixes the inner sealing ring 8, and prevents that when the valve core is opened, the inner sealing ring 8 moves or moves out to cause the valve core reset thereby causing a poor sealing. A guide rod plug boss 602 is disposed on the guide rod 6, one end of the explosion-proof valve spring 10 is pressed on the guide rod plug boss 602, which well prevents the explosion-proof valve spring 10 from sliding off.

An opening pressure of the explosion-proof valve core is controlled by spring force, where the opening pressure is 5 kPa to 50 kPa, as a further optimized opening pressure of the explosion-proof valve core, that is, an explosion-proof pressure is 7 kPa to 20 kPa. When a pressure in the box body reaches the explosion-proof pressure, the valve core is jacked up, a certain gap exists between the valve core and the inner sealing ring 9, the gas is rapidly discharged from the gas-permeable openings 702 and the gap to release pressure, which has excellent explosion-proof stability. When the pressure in the box body after discharging the gas and pressure releasing is less than the opening pressure of the valve core, the valve core rapidly resets under an action of the explosion-proof spring 10, the valve tightly presses the inner sealing ring to be sealed in a normal state.

Specifically, the explosion-proof valve further includes the outer sealing ring 9. An outer sealing ring groove 706 is disposed on a bottom surface of the valve body 7. The outer sealing ring 9 is disposed inside the outer sealing ring groove 706.

In the embodiment, design of the outer sealing ring 9 and the outer sealing ring groove 706 is beneficial to enhancing sealing performance of the valve body 7.

Specifically, installation holes 707 are disposed on one end of the valve body 7 distal from the explosion-proof valve core.

In the embodiment, the explosion-proof valve body is provided with four installation holes 707. Four small screw rods are selected to penetrate through upper through holes of the box body and are in threaded connection with the installation holes 707 of the explosion-proof valve body, so that the explosion-proof valve is fixedly installed on the box body.

Specifically, in one embodiment, installation threads 708 are disposed on and extends from one end of the valve body 7 distal from the explosion-proof valve.

In the embodiment, the installation threads 708 are installed in corresponding screw holes on the box body, so that the valve body 7 is fixedly connected with the box body. Or, one nut may be selected to penetrate through through holes on the box body and installed on the installation threads 708, so that the valve body 7 is fixedly connected with the box body. The two methods are convenient to operate and stable in connection.

As shown in FIGS. 7-10, the present disclosure provides a box body gas tightness detection clamp, including a clamp body 12, a magnet base 14, a clamp sealing ring 16, a guide pillar 17, and a clamp spring 13. The clamp body 12 has an internal hollow structure, one end of the clamp body 12 is closed and an opening is disposed on another end of the clamp body 12. A clamping jaw 121 configured to clamp in a clamping groove 703 is disposed on the opening. A first step 122 is disposed on the closed one end of the clamp body 12, a fourth groove 123 is disposed inside the first step 122. A guide pillar guiding hole 124 communicated with the clamp body 12 is disposed on a center of the fourth groove 123.

The magnet base 14 is disposed inside the clamp body 12; a second gas-permeable hole 143 penetrating through an extension direction of the magnet base 14, a magnet 15 configured to adsorb a metal sheet 4 in an explosion-proof valve core, and a clamp sealing ring 16 in sealing connection with an edge of a valve body edge plug boss 709 are disposed on a bottom surface of the magnet base 14.

A guide pillar plug boss 171 is disposed on a side wall of the guide pillar 17, a bottom surface of the guide pillar plug boss 171 is clamped at an end surface of the fourth groove 123, and the guide pillar plug boss 171 is inserted into the fourth groove 123 through rotating the guide pillar 17. A third gas-permeable hole 174 is disposed inside the guide pillar 17, a threaded hole 172 communicated with the third gas-permeable hole 174 is disposed on a surface of one end of the guide pillar 17, the one end of the guide pillar 17 sequentially penetrates through the guide pillar guiding hole 124 and the clamp spring 13 and connects with the magnet base 14, and the third gas-permeable hole 174 of the guide pillar 17 is communicated with the second gas-permeable hole 143.

As a preferred embodiment, when the gas tightness of the sealed box body is detected, the valve core is sucked up by the magnet 15 on the gas tightness detection clamp and the valve core is opened, compared with inflating from the gas-permeable membrane, venting from the threaded hole 172 and then inflating from the third gas-permeable hole 174 has a high gas inlet speed, short periods of time, and high detection efficiency, and does no damage the gas-permeable membrane and prevents the explosion-proof valve from being out of effect. After blasting and releasing pressure, when the pressure in the box body is less than an opening pressure of the valve core, the valve core automatically resets to maintain the sealing state, so that explosion-proof performance of the explosion-proof valve is accurately detected in a manufacture procedure, and quality of the explosion-proof is further ensured.

Specifically, a guide pillar connection part 142 corresponding to the guide pillar 17 is disposed on a surface of the magnet base 14, the guide pillar 17 is connected with the magnet base 14 through the guide pillar connection part 142. The clamp body 12 may preferably be a hollow semi-cylindrical shape.

In the embodiment, a seventh groove 146, a sixth groove 145, and a fifth groove 144, sequentially diffused outwards, are disposed on the bottom surface of the magnet base 14. The magnet 15 is placed in the seventh groove 146, the clamp sealing ring 16 is placed in the fifth groove 144, and the eighth groove 147 lower relative to the seventh groove 146 is disposed inside the seventh groove 146. The second gas-permeable hole 143 penetrating through the top and bottom is disposed inside the eighth groove 146, and the eighth groove 147 is communicated with the sixth groove 145. The sixth groove 145 is communicated with the second gas-permeable hole 143 through the eighth groove 147 to form a first gas-permeable channel. A second step 141 is formed between the surface of the magnet base 14 and the guide pillar connection part 142, so that the magnet base 14 is fixedly connected with the guide pillar 17.

In the embodiment, a plane 173 is disposed on the guide pillar 17, the threaded hole 172 is further disposed on a surface of the guide pillar 17, and the guide pillar 17 is communicated with the third gas-permeable hole 174 to form a second gas-permeable channel. A gas tube joint 19 is disposed inside the threaded hole 172, one end of the guide pillar 17 sequentially penetrates through the guide pillar guiding hole 124 and the clamp spring 13 and connects with the magnet base 14. The first gas-permeable channel is communicated with the second gas-permeable channel.

Specifically, the box body gas tightness detection clamp further includes a handle 18. The handle 18 is connected with the guide pillar 17, or is integrated with the guide pillar 17.

In the embodiment, the handle 18 is connected with the guide pillar 17 through threads, which facilitates processing and installation. Or, the handle 18 integrates with the guide pillar 17, which operation is convenient and rapid.

Specifically, the magnet 15 is a cylindrical or circular strong permanent magnet.

In the embodiment, the magnet 15 is preferably a strong permanent magnet, so that power supplies are not required to generate magnetism.

Working principles of the box body gas tightness detection clamp is as follows.

When detecting the gas tightness of the box body, firstly, the clamping jaw 121 is inserted into the clamping groove 703 on the valve body 703 of the explosion-proof valve, the clamp sealing ring 16 on the magnet base 14 is tightly attached to the valve body edge plug boss 709, a bottom surface of the guide pillar plug boss is clamped at the end surface of the fourth groove 123 and, the guide pillar plug boss 171 is inserted into the fourth groove 123 through rotating the guide pillar 17, at the same time, the magnet base 13 is lowered to a low position. The magnet 15 is attracted to the metal sheet 4 in the valve core, the valve core is sucked up and opened, and the gas enters and exits through the gas-permeable openings 702 and the gap between the first gas-permeable channel, the second gas-permeable channel, the explosion-proof valve core, and the inner sealing ring 8, so as to inflate or vacuumize the box body and keep pressure for a period of time to detect whether there is a gas leakage to verify the gas tightness of the box body. After detection, lifting the magnet base 14 by handing the handle 18, as the valve core rises, the explosion-proof spring 10 is continuously compressed, and elastic force is gradually increased. When suction force of the magnet 15 and the explosion-proof valve core is less than the elastic force of the explosion-proof valve spring 10, the magnet 15 is separated from the explosion-proof valve core, under an action of the explosion-proof valve spring 10, the explosion-proof valve core resets and maintains the sealing state. Further, the handle 18 continues to be pulled up to bring the guide pillar plug boss 171 over the first step 122, and rotates a certain angle, such as a ninety degree angle, to position the magnet base 14 in a high position.

The foregoing is only a preferred embodiment of the present disclosure, and is not intended to limit the scopes of patent protection of the present disclosure. Any equivalent structural transformation of the present disclosure by using the contents of the specification and drawings of the present disclosure, or any direct/indirect application in other related fields of technology under the concept of the present disclosure are included in the scopes of the patent protection of the present disclosure.

What is claimed is:

1. An explosion-proof valve core, comprising:
    a valve core body;
    a waterproof gas-permeable membrane;
    a membrane fixing member; and
    a metal sheet;
    wherein valve core gas-permeable grooves, a first groove, and a second groove lower relative to the first groove are disposed on a valve core body end surface; one end of each of the valve core gas-permeable grooves is communicated with the first groove, another end of each of the valve core gas-permeable grooves extends to an outer side of the valve core body; the waterproof gas-permeable membrane is disposed inside the second groove, the membrane fixing member is disposed inside the second groove and is pressed at an edge of a surface of the waterproof gas-permeable membrane; and the metal sheet is disposed inside the first groove.

2. The explosion-proof valve core according to claim 1, wherein a third groove lower relative to the second groove is disposed on the valve core body end surface.

3. The explosion-proof valve core according to claim 1, wherein metal sheet gas-permeable groove holes are disposed on the metal sheet, and the metal sheet gas-permeable groove holes are correspondingly communicated with the valve core gas-permeable grooves.

4. An explosion-proof valve, comprising:
    a valve body;
    an explosion-proof valve spring;
    an outer sealing ring;
    a guide rod;
    a protective shell; and
    an explosion-proof valve core;
    wherein an installation groove configured to install the explosion-proof valve core is disposed on a surface of the valve body, and the explosion-proof valve is sealed inside the installation groove; a clamping groove is disposed on a side surface of the valve body; a valve core guiding hole is disposed on a center of the valve body; an inner wall of the valve body is integrated with the valve core guiding hole through a plurality of connecting ribs, and gas-permeable openings are formed between each two adjacent connecting ribs; a first gas-permeable hole penetrating through an extension direction of the guide rod is disposed inside the guide rod, a rod connection part is disposed on a bottom surface of a valve core body, and a valve core gas-permeable hole communicated with a third groove is disposed inside the rod connection part; the guide rod sequentially penetrates through the explosion-proof valve spring, the valve core guiding hole, and the guide rod connection part in the bottom surface of the valve core body, and is further in sliding fit with the valve core guiding hole; an outer sealing ring groove is disposed on a bottom surface of the valve body; and an outer sealing ring is disposed inside the outer sealing ring groove.

5. The explosion-proof valve according to claim 4, further comprising:
    an inner sealing ring groove; and
    an inner sealing ring;
    wherein the inner sealing ring groove is a dovetail groove narrow at a top and wide at a bottom and is disposed on a bottom of the installation groove; and the inner sealing ring is disposed inside the inner sealing ring groove.

6. The explosion-proof valve according to claim 4, wherein installation holes are disposed on one end of the valve body distal from the explosion-proof valve core.

7. The explosion-proof valve according to claim 4, wherein installation threads are disposed on and extends from one end of the valve body distal from the explosion-proof valve.

8. The explosion-proof valve according to claim 4, wherein the protective shell is disposed on an outer side of the explosion-proof valve spring and is fixed below the valve body.

9. A box body gas tightness detection clamp, comprising:
a clamp body;
a magnet base;
a clamp sealing ring;
a guide pillar; and
a clamp spring;
wherein the clamp body has an internal hollow structure, one end of the clamp body is closed and an opening is disposed on another end of the clamp body; a clamping jaw configured to clamp in a clamping groove is disposed on the opening; a first step is disposed on the closed one end of the clamp body, a fourth groove is disposed inside the first step; a guide pillar guiding hole communicated with the clamp body is disposed on a center of the fourth groove;

the magnet base is disposed inside the clamp body; a second gas-permeable hole penetrating through an extension direction of the magnet base, a magnet configured to adsorb a metal sheet in an explosion-proof valve core, and a clamp sealing ring in sealing connection with an edge of an end surface of a valve body are disposed on a bottom surface of the magnet base; and a guide pillar plug boss is disposed on a side wall of the guide pillar, a bottom surface of the guide pillar plug boss is clamped at an end surface of the fourth groove, and the guide pillar plug boss is inserted into the fourth groove through rotating the guide pillar; a third gas-permeable hole is disposed inside the guide pillar, an gas-permeable groove communicated with the third gas-permeable hole is disposed on a surface of one end of the guide pillar, the one end of the guide pillar sequentially penetrates through the guide pillar guiding hole and the clamp spring and connects with the magnet base, and the third gas-permeable hole of the guide pillar is communicated with a second gas-permeable hole.

10. The box body gas tightness detection clamp according to claim 9, further comprising:
a handle;
wherein the handle is connected with the guide pillar, or is integrated with the guide pillar.

11. The box body gas tightness detection clamp according to claim 9, where the magnet is a cylindrical or circular strong permanent magnet.

* * * * *